United States Patent
Hilton et al.

(10) Patent No.: US 6,805,286 B2
(45) Date of Patent: Oct. 19, 2004

(54) DUAL MAGAZINE RECIRCULATING TRANSPORT

(75) Inventors: Graham H. Hilton, San Diego, CA (US); Peter L. Pham, San Diego, CA (US); Stephen W. Sansom, San Diego, CA (US); Michael McWhirr, Cheddar (GB); Christopher Palmer, Worle (GB)

(73) Assignee: Cubic Corporation

( * ) Notice: Subject to any disclaimer, the term of this patent is extended or adjusted under 35 U.S.C. 154(b) by 0 days.

(21) Appl. No.: 10/080,934

(22) Filed: Feb. 20, 2002

(65) Prior Publication Data

US 2003/0010827 A1 Jan. 16, 2003

Related U.S. Application Data

(60) Provisional application No. 60/270,078, filed on Feb. 20, 2001.

(51) Int. Cl.[7] .............................................. G06F 17/60
(52) U.S. Cl. ........................................................ 235/379
(58) Field of Search ................................ 235/379, 380, 235/375, 477, 487, 438, 384, 435, 449, 448, 443

(56) References Cited

U.S. PATENT DOCUMENTS

| | | | |
|---|---|---|---|
| 4,851,651 A | | 7/1989 | Gaucher |
| 4,968,873 A | | 11/1990 | Dethloff et al. |
| 5,250,793 A | * | 10/1993 | Nagashima et al. ........ 235/475 |
| 5,438,184 A | | 8/1995 | Roberts et al. |
| 5,440,108 A | | 8/1995 | Tran et al. |
| 5,450,051 A | * | 9/1995 | Stromberg ................... 235/384 |
| 5,553,320 A | * | 9/1996 | Matsuura et al. ........... 235/379 |
| 5,553,620 A | * | 9/1996 | Snider et al. ............... 600/440 |
| 5,606,158 A | * | 2/1997 | Takemoto et al. .......... 235/380 |
| 5,753,897 A | | 5/1998 | Kasper |
| 5,773,805 A | | 6/1998 | Nakamura et al. |
| 5,796,083 A | | 8/1998 | Kenneth et al. |
| 5,814,796 A | | 9/1998 | Benson et al. |
| 5,829,631 A | | 11/1998 | Kasper |
| 5,854,477 A | * | 12/1998 | Kawaji et al. ............... 235/384 |
| 5,949,046 A | | 9/1999 | Kenneth et al. |
| 5,984,181 A | | 11/1999 | Kreft |
| 6,129,275 A | | 10/2000 | Urquhart et al. |
| 6,283,368 B1 | * | 9/2001 | Ormerod et al. ............ 235/380 |
| 6,394,346 B1 | * | 5/2002 | Bonneau et al. ............ 235/438 |
| 6,474,549 B2 | * | 11/2002 | Katou et al. ................. 235/379 |
| 6,481,620 B1 | * | 11/2002 | Katou et al. ................. 235/379 |

FOREIGN PATENT DOCUMENTS

| | | | | |
|---|---|---|---|---|
| JP | 2000342837 A | * | 12/2000 | ............. A63F/7/02 |

\* cited by examiner

*Primary Examiner*—Thien M. Le
*Assistant Examiner*—Edwyn Labaze

(57) ABSTRACT

A ticket transport machine accepts fare media cards of various types and dimensions through an input bezel. The card is then fed through entry rollers where it is transported onto a rotating transport carrier and passed under a reader/writer antenna. The reader/writer antenna reads information encoded onto the card and based upon this information, the machine determines if the card can be re-circulated for later use. The card is then deposited into a storage stacker magazine where it can be retrieved at a later date for reissue to another user.

24 Claims, 2 Drawing Sheets

DUAL MAGAZINE RECIRCULATING TRANSPORT

CROSS-REFERENCES TO RELATED APPLICATIONS

This application claims the benefit of priority of U.S. provisional application Ser. No. 60/270,078 filed Feb. 20, 2001 which is incorporated herein by reference in its entirety.

BACKGROUND OF THE INVENTION

In typical mass transit ticket applications, a user uses a card to store information, such as a monetary value or personal information about the user. If a monetary value is encoded on the card, each time the card is used the monetary value is reduced. Once the monetary value on the card is depleted, the card is no longer useful and either the user throws the card away or a machine captures the card for storage in a bin so the owner or operator of the machine can dispose of the card. Currently mass transit vending machines are not capable of re-circulating the used card for later use. Various types of cards, such as smart cards, magnetic cards or security passes can be used in a mass transit system.

The term "smart card" is typically used to refer to various types of devices having an embedded integrated circuit for storing information. Smart card communication devices are used to write information to the card and to read information from the card. Some smart card communication devices may only have the ability to read from the smart card. Therefore, a smart card communication device may be a smart card reader, or a smart card reader/writer.

Typically, the machine or smart card communication device is connected to a host computer that regulates transactions between the smart card and the smart card communication device. In some systems, however, the host computer may be part of the smart card communication device. Smart card systems may include any number of host computers and communication devices depending on the particular configuration and requirements of the system.

The smart card is a small, usually credit card shaped, device that contains at least a memory device for storing information and a transceiver to communicate with a smart card communication device. The smart card communication device communicates through the transceiver on the smart card to access the stored information. The smart card communication device may simply read the information, load the information into the memory device or modify existing data in the memory device. For example, if the owner of a smart card uses a smart card containing financial information to make a purchase, the smart card communication device can read the information including the owner's identity and the availability of funds. The smart card communication device can also deduct the purchase amount from the available funds if it has writing capabilities. Further, the communication device can store transaction data on the smart card including the time and location of the transaction in addition to the identity of the communication device.

Existing smart cards can be classified as either contact or non-contact smart cards. It is not necessary for non-contact smart cards (also referred to as proximity cards) to physically contact a smart card communication device to exchange data. Proximity cards typically employ modulated radio frequency (RF) field and impedance modulation techniques to transfer data between the proximity card and the proximity card device.

Once the information contained on the smart card is no longer useful to the user or the monetary value has been depleted, the card has to be discarded or replenished. A mass transit vending machine capable of accepting any type of card from a user, storing it, and reissuing later with new encoded information is desired. This process is known as re-circulating cards.

SUMMARY OF THE INVENTION

It is an advantage of the present invention to provide a ticket transport machine that can re-circulate fare media cards.

In the exemplary embodiment of the present invention, a Ticket Transport Machine (TTM) contained in a vending machine accepts fare media cards of various types and dimensions through an input bezel. Once a user enters a card into the input bezel, the card is fed through entry rollers where it is transported onto a rotating carrier and passed under a smart card communication device known as a reader/writer antenna. The reader/writer antenna reads information encoded onto the card. Based upon information obtained from the card and instructions the user enters into a control panel on the front of the vending machine, the card is directed to one of five locations: the input bezel, a ticket chute, a first bin, a second bin or a first stacker.

If the user requests that additional information be added to the card, such as an increase in monetary value, the card is returned to the user either through the input bezel or through the ticket chute depending on how the ticket transport machine has been programmed. Typically, machines are programmed to return cards to a user through the ticket chute so if the user is receiving change, the card will be returned with the change. This helps ensure that the user will not forget to take his change. However, machines can be programmed to allow the owner to choose where the card will exit the machine.

If the user is finished using the card, the machine may keep the card and the card is transported to either the first bin, the second bin or the first stacker. The type of card determines where the machine directs the card for storage. Special cards, such as a card that is used for only a short allocated period of time as an advertisement, are transported to a first bin when the allocated period is over. If the reader/writer antenna and the card can not be read or the card is malfunctioning, it is transported to the second or reject bin. However, if the card is read and it is determined that the card can be used again, or re-circulated to another user, the card is transported to the first stacker. If the first stacker is full, the card is transported to the first bin.

The machine is also comprised of a second stacker to store new cards that have not been placed into circulation yet. Generally the owner of the machine loads the second stacker with unused cards and when a user requests a new card from the machine, a card is retrieved by a feeder mechanism from the second stacker and transported onto the rotating transport carrier. The rotating transport carrier transports the card under the reader/writer antenna where is it is encoded with information provided by the user, such as a monetary value if the card is being used for transportation. Once the card is encoded, the card is returned to the user either through the input bezel or the ticket chute as described above.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
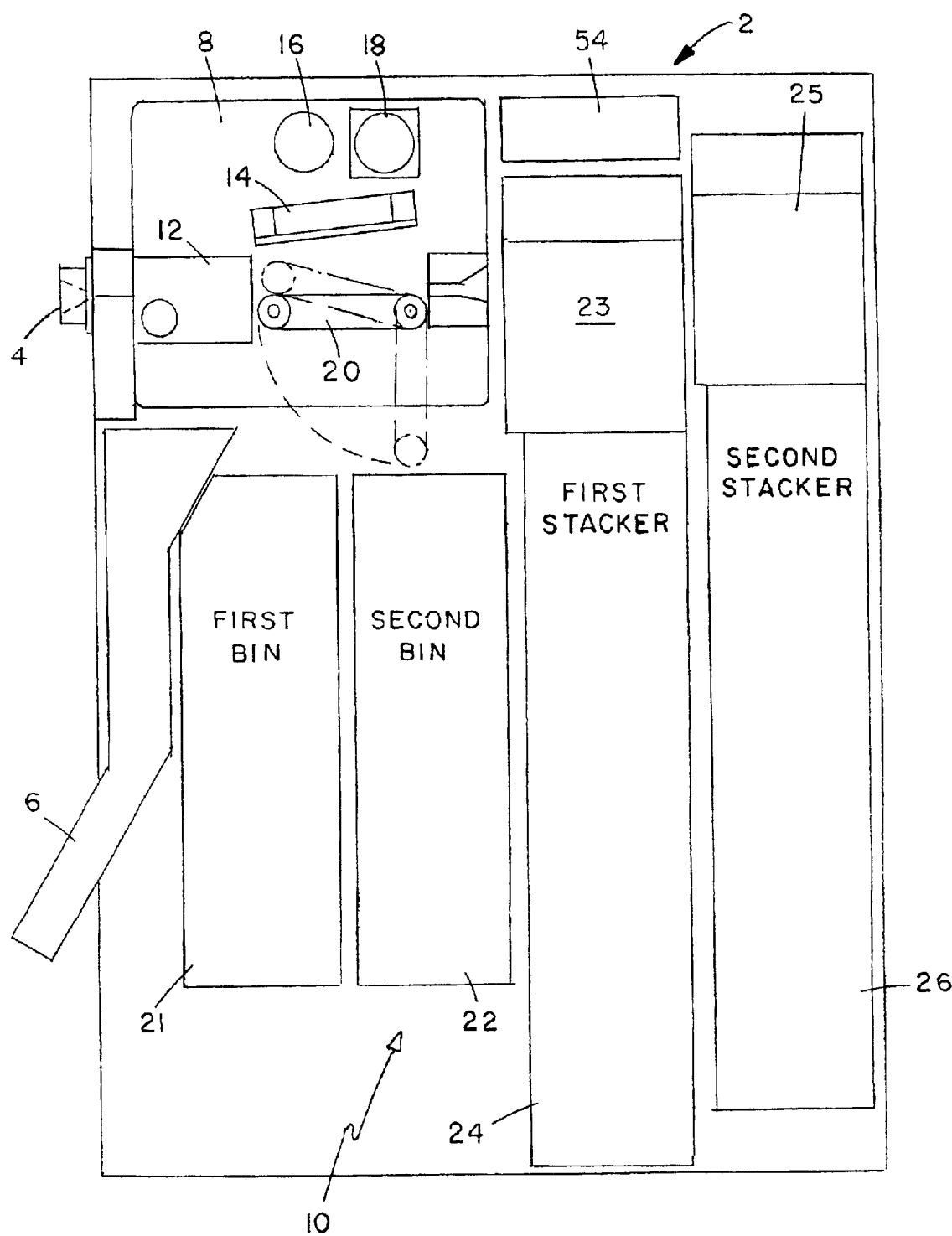
FIG. 1 is a block diagram of a ticket transport machine.

FIG. 1 illustrates a ticket transport machine 2 (contained in a vending machine) for use in a mass transit system that utilizes fare media cards ("cards"), such as a smart card, a magnetic card, security pass or any other card capable of storing electronic information. Although the present invention is described with reference to a mass transit system, the present invention is not limited to a mass transit system and can be utilized for any system that uses cards that store electronic information.

The ticket transport machine 2 is comprised of an input bezel 4, a ticket chute 6, a transport and rotator 8 and a storage area 10. Cards are entered into the input bezel 4 by a user and transported to the transport and rotator 8 where the machine 2 reads the information encoded on the card. The transport and rotator 8 is comprised of an input transport section 12, a reader/writer antenna 14 for reading and encoding the card, and first and second motors 16, 18 for driving a rotating transport carrier 20. Once the card has been input into the machine, the card is transported onto the rotating transport carrier 20 which transports the card under the reader/writer antenna 14 where the information encoded on the card is read and sent to a host computer for processing or information provided by the user or host computer is encoded on to the card.

The storage area 10 of the machine 2 is comprised of first and second bins 21, 22 and first and second magazines or stackers 24, 26. In the preferred embodiment, the first and second bins are physically one large bin that contain a removable divider, however, two separate bins can be utilized. Based upon the information that is read by the reader/writer antenna 20 and information obtained from the user by the host computer, such as personal information, whether additional money is being added to the card or whether the user no longer wants to retain the card, a determination is made of where to route the card. The first and second bins 21, 22 and the first and second stackers 24, 26 are specifically designated to store certain types of cards. The machine can be programmed by the owner or operator of the machine to store various types of cards in each location. However, in the preferred embodiment, the first bin 21 is used to store special cards that are only in circulation for a short period of time. Examples of special cards include cards that contain advertising or are directed toward a special event such as the Olympics or a circus that is in town for a limited time. After a certain date, the special cards are no longer applicable and the cards are taken out of circulation. If the reader/writer antenna 14 reads a special card that is past its circulation date, it is transported into the first bin 21 for later disposal by the owner or operator of the machine. Additionally, the first bin 21 can be used to store the overflow of cards from the first stacker 24. A sensor, located in the first stacker 24, indicates when the first stacker 24 is full so the card can be directed to the first bin 21 for storage.

In the preferred embodiment, the second bin 22 is used to store cards that are malfunctioning or are rejected by the ticket transport machine 2 as being unable to be re-circulated. If a user enters a card into the machine 2 and the card is unable to communicate with the reader/writer antenna 14, or there is a malfunction of the card, the card is transported into the second bin 22. The first stacker 24 stores cards that are continually being re-circulated. Typically, cards such as a single day or single ride card are stored in the first stacker 24. The second stacker 26 is used for storing cards that are used on a continual basis and will not be returned by the user after a short period of time. Cards can only be from the second stacker 26 and cards being returned by a user can not be placed into the second stacker 26. The second stacker 26 contains a stack of cards and first and second feeder mechanisms 23, 25 separate the top card from the stack and move the card into the transport and rotator 8. Once separated from the stack, the top card is passed over the top of the first stacker 24, through a guide channel 54 and transported onto the rotating transport carrier 20.

Figure 2:
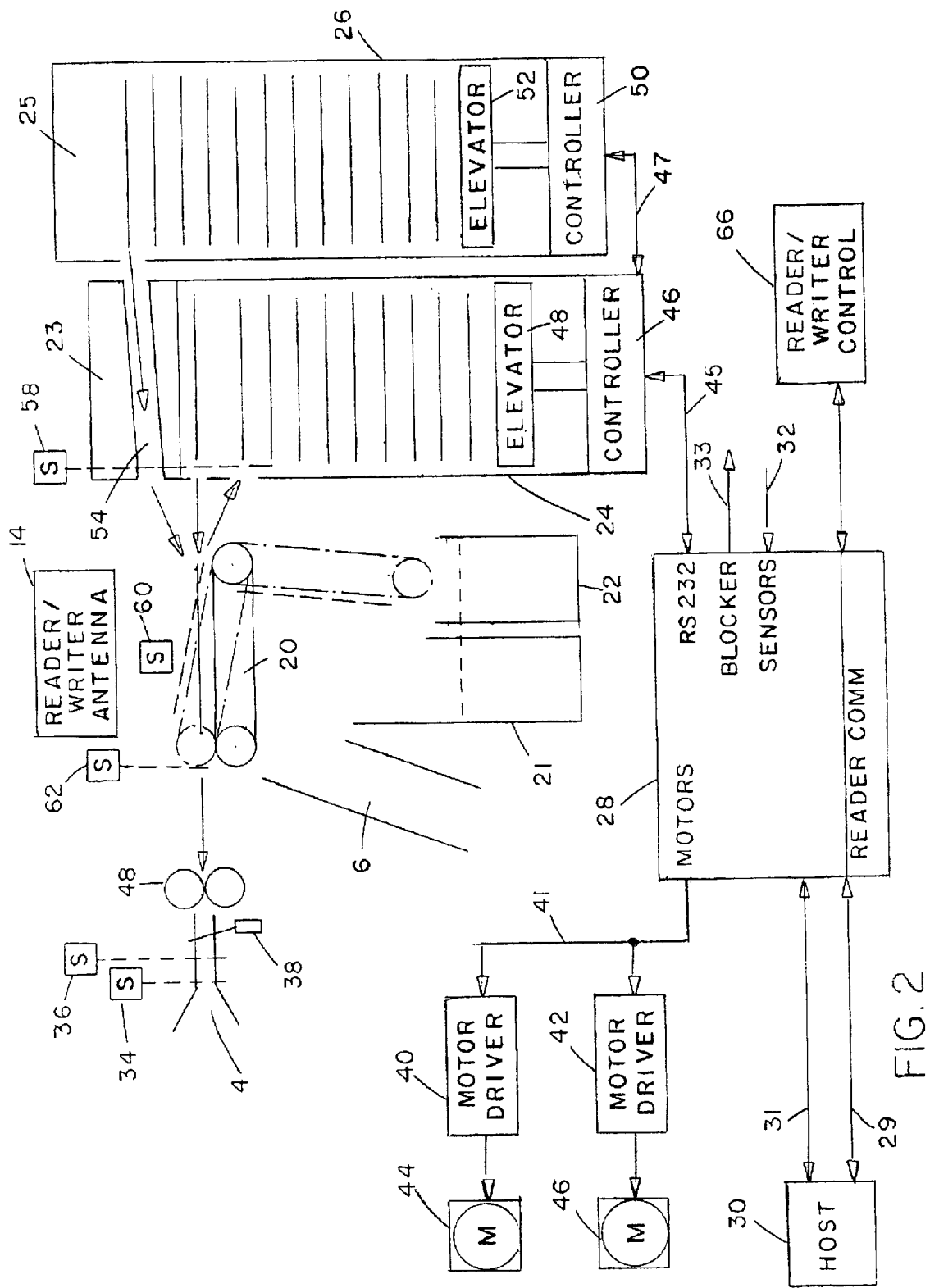
FIG. 2 is an illustration of the system block diagram of the ticket transport machine of FIG. 1.

FIG. 2 illustrates the system block diagram of the ticket transport machine 2 of FIG. 1. A micro controller board 28 is connected to an electrical control unit (ECU) or host computer 30 by transmission lines 29 and 31. The host computer 30 receives instructions from the user, via a control panel in the front of the vending machine (not shown), or from the owner of the machine as well as information about the card and the machine from the micro controller board 28, and based upon this information, determines how to process the card.

When a user enters a card into input bezel 4, front and rear throat sensors 34, 36 sense that a card has been entered into the machine and a signal is sent to the micro controller board via transmission line 32. Upon receiving the signal, the micro controller board 28 sends a signal, via transmission line 33, to a blocker 38 located in the input transport section of the machine 12 causing the blocker 38 to open and allow passage of the card into entry rollers 48. At the same time, a signal is also sent to first and second motor drivers 40, 42, via transmission line 41, activating first and second motors 44, 46 causing the entry rollers to rotate, capture the card and transport it onto the rotating transport carrier 20.

Once on the rotating transport carrier 20, the card is placed under the reader/writer antenna 14 which determines the status of the card, which is communicated to the micro controller board 28. The micro controller board 28 then processes this information and determines where to transport the card and instructs the reader/writer antenna 14 to either encode the card with additional information, such as an increase in the monetary value, and return the card to the user or store the card in the storage area 10 of the machine. If the card is encoded with additional information, this information is sent from the micro controller board 28 to the reader/writer control 66 which instructs the reader/writer antenna 14 to encode the information onto the card. If the card is being stored, under the control of the micro controller board 28, the rotating transport carrier 20 transports the card to one of five places, described with reference to FIG. 1.

When a card can be re-circulated, the card is stored in the first stacker 24. To transport the card into the first stacker 24, the rotating carrier tilts upwards until carrier sensors 60, 62 sense that the rotating carrier 20 is at the proper angle. A signal is then sent to the micro controller board 28, via transmission line 32, and the micro controller board 28 instructs the belt on the carrier 20 to move so the card is transported into the first stacker 24. To accommodate the card, the stack of cards presently stored in the first stacker 24 is lowered by a first drive mechanism, comprised of a first controller 46 and a first elevator 48, which is controlled by the micro controller board 28. The micro controller board 28 sends a signal to the first controller 46 via an RS232 transmission line 45 which causes the stack of cards located on top of the first elevator 48 to move upward so that the card can be passed from the rotating transport carrier onto the top of the stack in the first stacker 24. However, if a stacker sensor 58 senses the capacity of the first stacker is full, the stacker sensor 58 sends a signal to the micro controller board 28, via transmission line 32, which then sends a signal to the rotating transport carrier 20 so that the carrier tilts downward to allow the card to be passed into the first bin 21.

If the reader/writer antenna 14 determines that the card is a special card that is no longer applicable, the card is taken out of circulation and transported to the first bin 21. The host computer 30 instructs the micro controller board 28 to tilt the rotating transport carrier 20 downwards until it is at the proper angle to transport the card into the first bin 21. A signal is then sent to the micro controller board 28, via transmission line 32, and the micro controller board 28 instructs the belt on the carrier 20 to move so the card is transported into the first stacker 24.

If the reader/writer antenna 14 determines that the card can not be read or is malfunctioning and the card can not be re-circulated, the host computer instructs the micro controller board 28 to tilt the rotating carrier downwards until it is at the proper angle to transport the card into the second bin 22. A signal is then sent to the micro controller board 28, via transmission line 32, and the micro controller board 28 instructs the belt on the carrier 20 to move so the card is transported into the first stacker 24.

If the user requests a new card that is to be continually used for an extended period of time, a card is retrieved from the top of the stack in the second stacker 26 by the second feeder mechanism 25. A second drive mechanism, which is comprised of a second controller 50 and a second elevator 52, causes the stack of cards in the second stacker 26 to move upward. The card is passed over the top of the first stacker 24, through a guide channel 54, and transported onto the rotating transport carrier 20.

Once secured on the rotating transport carrier 20, the card is encoded by the reader/writer antenna 14 with information provided by the user, such as a monetary value. After the card has been encoded, the rotating transport carrier 20 rotates downward wherein the card is passed through the ticket chute 6 or input bezel 4 where the user can retrieve the card.

Although an exemplary embodiment of the invention has been described above by way of example only, it will be understood by those skilled in the field that modifications may be made to the disclosed embodiment without departing from the scope of the invention, which is defined by the appended claims.

We claim:

1. A ticket transport machine for re-circulating cards, the machine comprising
   a transport and rotator, said transport and rotator comprising:
      an input bezel for receiving a card from a user; and
      a rotating transport carrier, coupled to said input bezel, for directing said card under a reader/writer antenna for determining the status of said card; and
   a storage area, coupled to said transport and rotator, for storing and re-circulating said card, the status of said card determines where said card will be stored said storage area comprising:
      a first bin:
      a second bin, coupled to said first bin, said card input by said user through the input bezel stored in said first or second bin
      a first stacker, coupled to said second bin and
      a second stacker, coupled to said first stacker, wherein said
      first stacker and said second stacker having first and second feeder mechanisms separate a top card from a card stack and move said top card through a guide channel into said transport and rotator.

2. The ticket transport machine of claim 1, wherein if said card is damaged or is unable to communicate with said reader/writer antenna, said card is transported into said first bin.

3. The ticket transport machine of claim 2, further comprising:
   a host computer, coupled to said transport and rotator, for processing information retrieved from said card; and
   a micro controller board, coupled to said host computer, for receiving the status of said card from said reader/writer antenna.

4. The ticket transport machine of claim 3, further comprising:
   a reader/writer control, coupled to said reader/writer antenna, for instructing said reader/writer antenna whether to encode or read information from said card.

5. The ticket transport machine of claim 4, wherein said user determines where said card will be dispensed from said machine.

6. The ticket transport machine of claim 5, wherein said first stacker comprises a first drive mechanism for raising and lowering said card stack located in said first stacker.

7. The ticket transport machine of claim 6, wherein said first drive mechanism comprises a first controller and a first elevator for raising and lowering said card stack.

8. The ticket transport machine of claim 5, wherein said second stacker includes a second drive mechanism for raising and lowering said card stack located in said second stacker.

9. The ticket transport machine of claim 8, wherein said second drive mechanism includes a second controller and a second elevator for raising and lowering said card stack.

10. The ticket transport machine of claim 1, wherein said card is selected from a group consisting of smart cards, magnetic cards and security passes.

11. The machine of claim 1, wherein said top card is separated from said card stack if said user requests a new card from the machine.

12. A ticket transport machine for re-circulating cards, the machine comprising:
   a transport and rotator, said transport and rotator comprising:
      an input bezel for receiving a card from a user, and
      a reader/writer antenna, coupled to the input bezel, for determining the status of said card; and
   a storage area, coupled to said transport and rotator, for storing and re-circulating said card, the status of said card determines where said card will be stored, said storage area comprising:
      a first bin:
      a second bin, coupled to said first bin, said card input by said user through the input bezel stored in said first or second bin;
      a first stacker, coupled to said second bin; and
      a second stacker, coupled to said first stacker, wherein said first stacker and said second stacker having first and second feeder mechanisms separate a top card from a card stack and move said top card through a guide channel into said transport and rotator.

13. The transport machine of claim 12, further comprising a rotating transport carrier, coupled to said input bezel, for directing said card under said reader/writer antenna.

14. The ticket transport machine of claim 1, wherein if said card is damaged or is unable to communicate with said reader/writer antenna, said card is transported into said first bin.

15. The ticket transport machine of claim 14, further comprising:
- a host computer, coupled to said transport and rotator, for processing information retrieved from said card; and
- a micro controller board, coupled to said host computer, for receiving the status of said card from said reader/writer antenna.

16. The ticket transport machine of claim 15, further comprising:
- a reader/writer control, coupled to said reader/writer antenna, for instructing said reader/writer antenna whether to encode or read information from said card.

17. The ticket transport machine of claim 16, wherein said user determines where said card will be dispensed from said machine.

18. The ticket transport machine of claim 17, wherein said first stacker comprises a first drive mechanism for raising and lowering said card stack located in said first stacker.

19. The ticket transport machine of claim 18, wherein said first drive mechanism comprises a first controller and a first elevator for raising and lowering said card stack.

20. The ticket transport machine of claim 17, wherein said second stacker includes a second drive mechanism for raising and lowering said card located in said second stacker.

21. The ticket transport machine of claim 20, wherein said second drive mechanism includes a second controller and a second elevator for raising and lowering said card stack.

22. The ticket transport machine of claim 12, wherein said card is selected from a group consisting of smart cards, magnetic cards and security passes.

23. The machine of claim 12, wherein said top card is separated from said card stack if said user requests a new card from the machine.

24. A ticket transport machine, comprising:
- a transport and rotator, the transport and rotator, comprising:
  - an input bezel for receiving a card from a user; and
  - a pivotable transport carrier, coupled to the input bezel, for directing an inserted card adjacent to a reader/writer antenna for determining the status of the card; and
- a storage area, coupled to the transport and rotator, for storing or re-circulating the card, with the status of the card determining where the card will be stored, a storage area comprising:
  - at least one stacker coupled to at least one bin, the stacker and the bin having feeder mechanisms to separate a card from a card stack and to move the card through a guide channel into the transport and rotator for dispensing the card from the ticket transport machine.

* * * * *